United States Patent [19]

Blaimschein

[11] Patent Number: 5,007,626
[45] Date of Patent: Apr. 16, 1991

[54] APPARATUS FOR PICKING UP A FLAT WORK PIECE FROM AN ADHERING SUBSTRATE

[76] Inventor: Gottfried Blaimschein, Arnhalmweg 33, A-4407 Steyr, Austria

[21] Appl. No.: 490,054

[22] Filed: Mar. 7, 1990

[30] Foreign Application Priority Data

Mar. 17, 1989 [AT] Austria ................................ 614/89

[51] Int. Cl.$^5$ .............................................. B65H 3/20
[52] U.S. Cl. .......................................... 271/33; 271/4; 271/207
[58] Field of Search .................... 271/3, 4, 6, 33, 191, 271/207, 275, 306-308

[56] References Cited

U.S. PATENT DOCUMENTS

| | | | |
|---|---|---|---|
| 2,919,129 | 12/1959 | Sjostrom | 271/33 |
| 3,083,961 | 4/1963 | Arbter | 271/33 |
| 3,448,979 | 6/1969 | Farmer | 271/33 |
| 3,580,564 | 5/1971 | Boynton et al. | 271/33 |
| 4,153,240 | 5/1979 | Gouley | 271/33 |
| 4,887,858 | 12/1989 | Gazzarrini | 271/33 |

FOREIGN PATENT DOCUMENTS

| | | | |
|---|---|---|---|
| 0253779 | 1/1988 | European Pat. Off. | |
| 1558650 | 1/1969 | France | 271/33 |
| 250914 | 10/1987 | German Democratic Rep. | 271/33 |

*Primary Examiner*—Robert P. Olszewski
*Assistant Examiner*—Steve Reiss
*Attorney, Agent, or Firm*—Kurt Kelman

[57] ABSTRACT

Flat work pieces can be rationally and carefully removed from a substrate to which they adhere with an apparatus which comprises a pickup table, a receiving table spaced from the pickup table, and a vertically adjustable tool carrier movable between the tables. The tool carrier carries a pickup device comprising a pressure platen configurated to conform to the flat work piece and having opposite ends, an adhesive strip extending over the pressure platen between the ends thereof, two guide rollers respectively recessed from the opposite ends of the pressure platen, the guide rollers being arranged to guide the adhesive strip under tension over the pressure platen, and two reeling drums receiving respective ends of the adhesive strip beyond the guide rollers and rotatable to displace the adhesive strip in an operating direction by reeling the adhesive strip on one of the drums and unreeling the same from the other drum. The tool carrier is arranged to be lowered until the adhesive strip contacts the flat work piece and then picks up the flat work piece from the substrate on the pickup table surface upon raising the tool carrier, to be moved to the receiving table with the picked-up flat work piece adhering to the adhesive strip and then to be lowered until the flat work piece rests on the receiving table surface, and the adhesive strip is displaceable parallel to the receiving table surface and in a direction opposite to the direction of the tool carrier whereby the adhesive strip is pulled off the flat work piece resting on the receiving table surface.

10 Claims, 2 Drawing Sheets

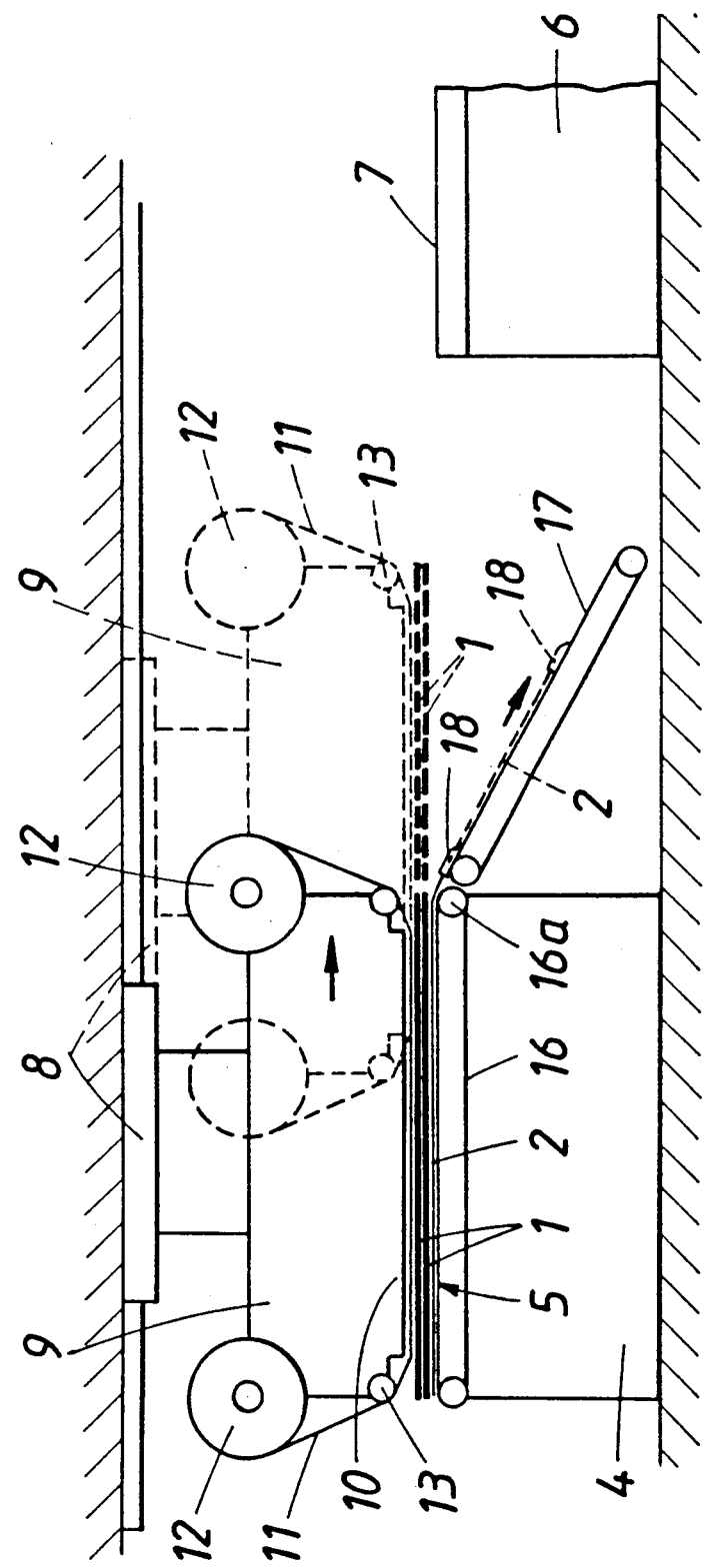

APPARATUS FOR PICKING UP A FLAT WORK PIECE FROM AN ADHERING SUBSTRATE

SUMMARY OF THE INVENTION (1) Field of the Invention

The present invention relates to an apparatus for picking up a flat work piece from a substrate to which it adheres, which comprises a pickup table having a surface for receiving the substrate carrying the flat work piece, a receiving table spaced from the pickup table and having a surface for receiving the flat work piece picked up from the substrate, and a vertically adjustable tool carrier movable between the tables and carrying a pickup device.

(2) Description of the Prior Art

To enable flat work pieces to be separated automatically from an adhering substrate, which is of particular importance in separating blanks cut out from a laminated sheet material from a substrate to which the blanks adhere and the scrap, it has been proposed to use such pickup devices as suction cups or needle grippers. Such devices are, however, unsatisfactory because they are expensive and, in addition, such removal tools often misfunction and also may cause damage to the work pieces.

While U.S. Pat. No. 3,083,961 and European patent application No. 253,779, published Jan. 20, 1988, disclose adhesive strips moved between two reeling drums and tensioned by two guide rollers for picking up and conveying flat work pieces, these work pieces are then merely stripped off the adhesive strip (according to the U.S. patent) or sucked off (according to the European patent application). This is possible only if the adhering force between the adhesive strip and the work piece is weak. Therefore, these known pickup devices can be used only for loosely arranged textile work pieces and are useless for the removal of more strongly adhering, film-like work pieces.

SUMMARY OF THE INVENTION

It is the primary object of this invention to overcome these disadvantages and to provide an apparatus of the first-described type which is not only simple in structure but also permits a rational and dependable removal of flat work pieces without danger of damage thereto.

This and other objects are accomplished in such an apparatus according to the invention with a pickup device comprising a pressure platen configurated to conform to the flat work piece and having opposite ends, an adhesive strip extending over the pressure platen between the ends thereof, two guide rollers respectively recessed from the opposite ends of the pressure platen, the guide rollers being arranged to guide the adhesive strip under tension over the pressure platen, and two reeling drums receiving respective ends of the adhesive strip beyond the guide rollers and rotatable to displace the adhesive strip in an operating direction by reeling the adhesive strip on one of the drums and unreeling the same from the other drum. The tool carrier is arranged to be lowered until the adhesive strip contacts the flat work piece and then picks up the flat work piece from the substrate on the pickup table surface upon raising the tool carrier, to be moved to the receiving table with the picked-up flat work piece adhering to the adhesive strip and then to be lowered until the flat work piece rests on the receiving table surface, and the adhesive strip is displaceable parallel to the receiving table surface and in a direction opposite to the direction of the tool carrier movement whereby the adhesive strip is pulled off the flat work piece resting on the receiving table surface. Preferably, the apparatus further comprises means for applying sub-atmospheric pressure to the surfaces of the pickup and receiving tables for respectively retaining the substrate and the flat work piece on the table surfaces, and the adhesive force of the adhesive strip exceeds the retaining force of the sub-atmospheric pressure means.

Because of the pickup strip's adhesive force, the flat work piece will be bonded thereto when the pressure platen is pressed thereagainst and if this adhesive force exceeds that between the substrate and the work piece, it will be picked up from the substrate upon raising the tool carrier, the substrate being suitably retained on the pickup table surface, for example by an adhesive coating on the surface or, preferably, by suction applied thereto. Only the work piece adhering to the adhesive strip is lifted and the substrate and/or scrap remain on the pickup table. To detach the work piece from the adhesive strip, it is placed on the receiving table surface where it is retained by a suitable adhesive surface coating or, preferably, by suction while the tool carrier is displaced in the direction of the longitudinal extension of the adhesive strip relative to the receiving table and the work piece retained thereon. At the same time, the adhesive strip is displaceable parallel to the receiving table surface and in a direction opposite to the direction of the tool carrier by reeling the strip from one to the other reeling drum whereby the adhesive strip is pulled off the flat work piece resting on the receiving table surface by the guide roller which trails in the direction of movement of the tool carrier. This stripping action effected by the trailing guide roller enables even strongly adhering pickup strips to be separated from the work piece, and the work piece remains on the receiving table surface. Since the flat work pieces are held over their entire surface by the pickup strip, there is no danger of damage to the work piece. The pressure platen is configurated to conform to the flat work piece so that it will press against the underlying sheet material only within the boundaries of the work piece. It may be readily exchanged, of course, to conform to differently shaped or dimensioned flat work pieces.

BRIEF DESCRIPTION OF THE DRAWING

The above and other objects, advantages and features of the invention will become more apparent from the following detailed description of certain now preferred embodiments thereof, taken in conjunction with the accompanying schematic drawing wherein FIG. 1 shows a diagrammatic side elevational view of one embodiment of the apparatus and FIG. 2 is a like view of another embodiment thereof.

DETAILED DESCRIPTION OF PREFERRED EMBODIMENTS

Figure 1:
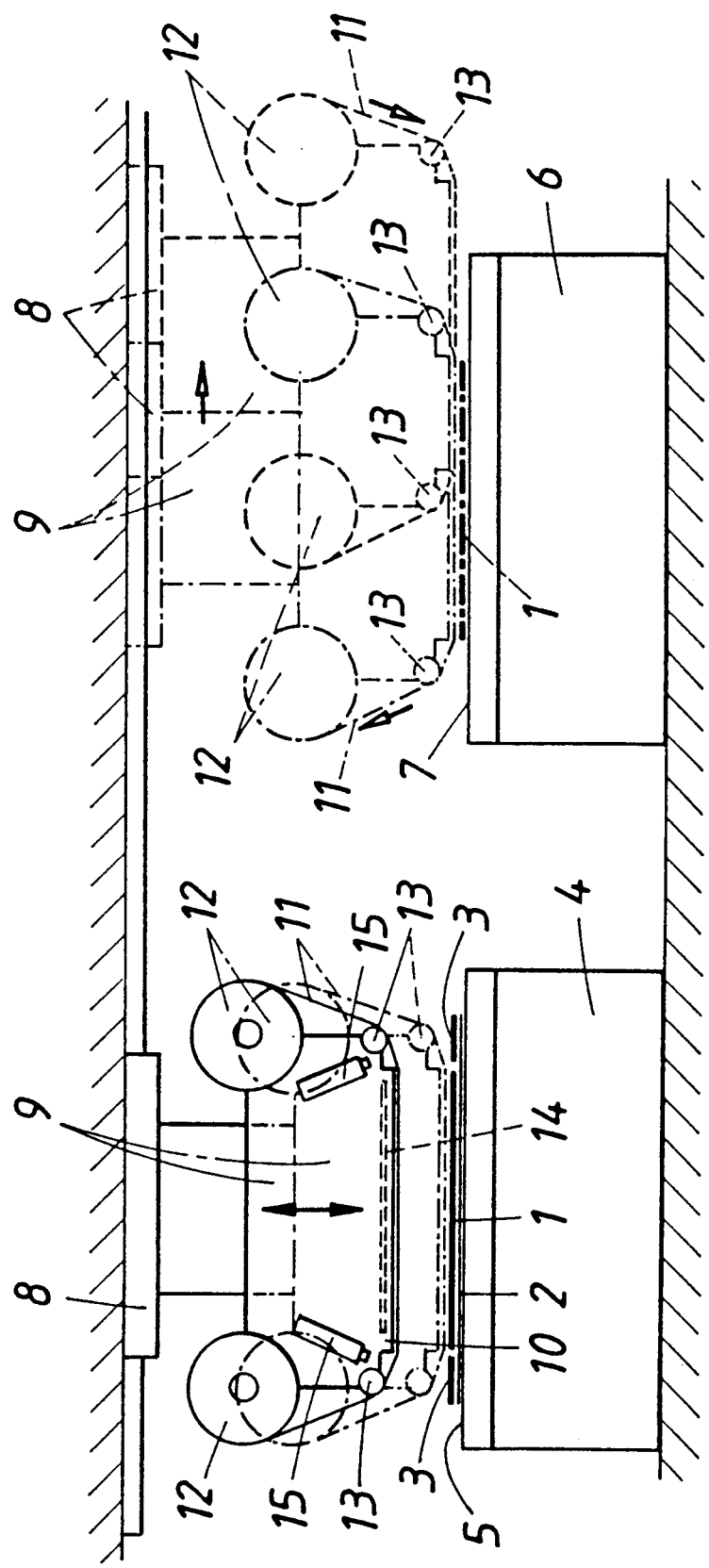

In the drawing, like reference numerals in both figures refer to like elements functioning in a like manner.

Referring first to FIG. 1, there is shown an apparatus for picking up flat work piece 1, such as a cut-out blank, from substrate 2 to which it adheres as well as scrap remaining from the sheet material after the cut-out operation. The illustrated apparatus comprises pickup table 4 having surface 5 for receiving the substrate carrying the flat work piece. According to a preferred feature, the pickup table surface is under sub-atmospheric pressure to retain the substrate and scrap thereon. Receiving or work table 6 is spaced from the pickup table and has surface 7 for receiving the flat work piece picked up from the substrate, the receiving table surface also preferably being under sub-atmospheric pressure to retain the received flat work piece thereon. Sub-atmospheric pressure may be applied to the table surfaces by such means as underlying suction boxes. Vertically adjustable tool carrier 9 is movable between the tables by a diagrammatically indicated sliding carriage or trolley 8. The tool carrier carries a work piece pickup device comprising downwardly projecting pressure platen 10 configured to conform to the flat work piece and having opposite ends, and adhesive strip 11 extending over the pressure platen between the ends thereof. The adhesive force of pickup strip 11 exceeds that between substrate 2 and work piece 1. Two guide rollers 13 respectively recessed from the opposite ends of pressure platen 10 are arranged to guide adhesive strip 11 under tension over the pressure platen, and two reeling drums 12 receive respective ends of the adhesive strip beyond the guide rollers and are rotatable to displace the adhesive strip in an operating direction by reeling the adhesive strip on one of the drums and unreeling the same from the other drum. To pick up work piece 1, tool carrier 9 is lowered over pickup table 4 until adhesive strip 11 contacts flat work piece 1 (see chain-dotted lines) and then picks up the flat work piece from substrate 2 on pickup table surface 5 upon raising the tool carrier (see full lines), and the tool carrier is then moved to receiving table 6 with the picked-up flat work piece 1 adhering to adhesive strip 11 (see chain-dotted lines) and is then lowered until the flat work piece rests on receiving table surface 7. Tool carrier 9 is then moved further in the direction of the longitudinal extension of the adhesive strip (see phantom lines) and adhesive strip 11 is displaceable parallel to the receiving table surface and in a direction opposite to the direction of the tool carrier movement whereby the trailing guide roller 13 smoothly pulls adhesive strip 11 off flat work piece 1 resting on receiving table surface 7, thus cleanly separating the adhesive strip from the work piece at the rear end thereof while the work piece is retained on the receiving table surface by the sub-atmospheric pressure applied thereto. When tool carrier 9 has been moved a distance substantially corresponding to the length of work piece 1 and adhesive strip 11 has thus been fully separated from the work piece, the tool carrier is raised again and returned to the pickup position over pickup table 4 to be ready for the next pickup operation.

The adhesive force of pickup strip 11 may be enhanced, depending on the type of adhesive used, by providing heating device 14 for the pressure platen because the adhesive force of most adhesives is temperature-dependent. Any suitable heating device, such as heating coils or wires may be installed in the pressure platen. Also, to enable the apparatus to pick up work pieces exceeding the dimension of the pressure platen or having portions projecting beyond the circumference of the pressure platen, the apparatus may further comprise auxiliary work piece removal tool means mounted on tool carrier 9 at the opposite ends of the pressure platen, such as needle grippers 15 or vacuum suction devices. Such auxiliary work piece removal tool means may be operated when the configuration of the work piece requires gripping of certain portions of the work piece that do not adhere to pickup strip 11. In this manner, even complexly configured work pieces may be picked up without any difficulty or damage thereto.

In the embodiment of FIG. 2, the pickup apparatus further comprises descending conveyor 17 mounted adjacent pickup table 4 and leading from one end of pickup table surface 5 downwardly. The conveyor is equipped with gripping device 18 for gripping substrate 2 on the pickup table surface and tool carrier 9 is arranged to be moved parallel to the pickup table surface beyond the one end thereof to receiving table 6 with the picked-up flat work piece adhering to adhesive strip 11, conveyor 17 and tool carrier 9 moving at the same speed. As shown, pickup table surface 5 is constituted by conveyor belt 16 moving at the same speed as the conveyor and the tool carrier. Conveyor 17 may be comprised of at least two conveyor belts extending parallel to each other, each conveyor belt being equipped with a respective one of the gripping devices.

As the tool carrier moves the picked-up flat work piece beyond conveyor belt 16, substrate 2 held by gripping device 18 will be moved over pulley 16a supporting the conveyor belt at the one end onto conveyor 17 and will thus be removed. This makes it possible to remove the substrate not only in case the excess of adhesive force of pickup strip 11 is insufficient but also to superpose several work pieces 1 on the substrate and to pull off the substrate from below the lowest work piece, the stack of superposed work pieces adhering to pickup strip 11 then being picked up by the strip and conveyed to receiving table 6 in the above-described manner, where the adhesive pickup strip is then detached from the uppermost work piece by the described displacement of the tool carrier and adhesive strip.

This embodiment makes it possible to pick up work pieces from an adhering substrate even under the most difficult conditions. The combined movement of the tool carrier and the descending conveyor enables the substrate to be peeled off an adhering work piece even where the bonding therebetween is quite strong because the incremental pulling of one layer from the other is easier than lifting the one layer from the other over the entire surface thereof. In this way, work pieces may be picked up by pickup strips having a relatively weak adhesion and, furthermore, several work pieces may be superposed before they are further worked on at the receiving table while they are stripped of their substrate. Since only the uppermost work piece adheres to the adhesive pickup strip, it is possible in most instances to separate the substrate from the first work piece simply by lifting the adhesive strip with the work piece adhering thereto. When such a work piece separated from its substrate is then placed upon another workpiece, the two work pieces adhere to each other with the same force as the substrate adhered to the work piece. Therefore, to separate the substrate from the second or subsequent work piece, it is only necessary to clamp the edge of this substrate to the gripping device of the descending conveyor and to move the tool carrier with the superposed work pieces along the pickup table surface while the conveyor simultaneously pulls the substrate over the edge of the pickup table or, if the pickup table surface is constituted by a moving conveyor belt, over the conveyor belt guide pulley, which causes the substrate to be pulled from the work piece without the superposed work pieces becoming detached from each other. This procedure may be repeated as often as desired to stack any desired number of work pieces which stick to each other while the substrate of the lowermost work piece is always removed by the combined movement of the longitudinally displaceable tool carrier and the descending substrate removal conveyor. While the longitudinal movement of the work pieces is facilitated if the pickup table surface is constituted by a moving conveyor belt, it would also be possible to push the stack of work pieces glidingly along a low-friction, smooth fixed surface of the pickup table by moving the tool carrier therealong. Stacking several work pieces or blanks is often required if the work pieces are in the form of strips so that it may be possible to construct different cross sectional shapes with work pieces of varying widths.

If the descending conveyor is comprised of two parallel conveyor belts, each with its own gripping device, suitably dimensioned strips of the starting sheet material may be placed on the fixed surface of the pickup table side-by-side and these sheet material strips may be stacked on the pickup table surface while a respective conveyor belt is associated with each strip to remove the substrates from the lowest strips of each stack in the above-described manner.

What is claimed is:

1. An apparatus for picking up a flat work piece from a substrate to which it adheres, which comprises
   (a) a pickup table having a surface for receiving the substrate carrying the flat work piece,
   (b) a receiving table spaced from the pickup table and having a surface for receiving the flat work piece picked up from the substrate, and
   (c) a vertically adjustable tool carrier movable between the tables and carrying a pickup device comprising
      (1) a pressure platen configurated to conform to the flat work piece and having opposite ends,
      (2) an adhesive strip extending over the pressure platen between the ends thereof,
      (3) two guide rollers respectively recessed from the opposite ends of the pressure platen, the guide rollers being arranged to guide the adhesive strip under tension over the pressure platen, and
      (4) two reeling drums receiving respective ends of the adhesive strip beyond the guide rollers and rotatable to displace the adhesive strip in an operating direction by reeling the adhesive strip on one of the drums and unreeling the same from the other drum,
      (5) the tool carrier being arranged to be lowered until the adhesive strip contacts the flat work piece and then picks up the flat work piece from the substrate on the pickup table surface upon raising the tool carrier, to be moved to the receiving table with the picked-up flat work piece adhering to the adhesive strip and then to be lowered until the flat work piece rests on the receiving table surface, and the adhesive strip is displaceable parallel to the receiving table surface and in a direction opposite to the direction of the tool carrier movement whereby the adhesive strip is pulled off the flat work piece resting on the receiving table surface.

2. The apparatus of claim 1, further comprising means for applying sub-atmospheric pressure to the surfaces of the pickup and receiving tables for respectively retaining the substrate and the flat work piece on the table surfaces.

3. The apparatus of claim 2, wherein the adhesive force of the adhesive strip exceeds the retaining force of the sub-atmospheric pressure means.

4. The apparatus of claim 1, further comprising auxiliary work piece removal tool means mounted on the tool carrier at the opposite ends of the pressure platen.

5. The apparatus of claim 4, wherein the work piece removal tool means are needle grippers.

6. The apparatus of claim 4, wherein the work piece removal tool means are vacuum suction devices.

7. The apparatus of claim 1, further comprising a heating device for the pressure platen.

8. The apparatus of claim 1, further comprising a descending conveyor mounted adjacent the pickup table and leading from one end of the pickup table surface downwardly, the conveyor being equipped with a gripping device for gripping the substrate on the pickup table surface, the tool carrier being arranged to be moved parallel to the pickup table surface beyond the one end thereof to the receiving table with the picked-up flat work piece adhering to the adhesive strip, the conveyor and the tool carrier moving at the same speed.

9. The apparatus of claim 8, wherein the pickup table surface is constituted by a conveyor belt moving at the same speed as the conveyor and the tool carrier.

10. The apparatus of claim 8, wherein the conveyor is comprised of at least two conveyor belts extending parallel to each other, each conveyor belt being equipped with a respective one of the gripping devices.

* * * * *